US007000849B2

(12) United States Patent
Ashworth et al.

(10) Patent No.: US 7,000,849 B2
(45) Date of Patent: Feb. 21, 2006

(54) THERMOSTAT WITH CONFIGURABLE SERVICE CONTACT INFORMATION AND REMINDER TIMERS

(75) Inventors: Nicholas Ashworth, Dublin, OH (US); John G. Chapman, Delaware, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 10/713,292

(22) Filed: Nov. 14, 2003

(65) Prior Publication Data

US 2005/0103875 A1 May 19, 2005

(51) Int. Cl.
F25B 49/00 (2006.01)
(52) U.S. Cl. .................. 236/94; 236/46 R; 62/127; 62/157
(58) Field of Classification Search .................. 236/94, 236/46 R; 62/125, 126, 127, 157, 158
See application file for complete search history.

(56) References Cited

U.S. PATENT DOCUMENTS

| | | | | |
|---|---|---|---|---|
| 5,012,973 A | * | 5/1991 | Dick et al. ................ | 236/46 R |
| 5,482,209 A | * | 1/1996 | Cochran et al. .......... | 236/46 R |
| 5,682,206 A | * | 10/1997 | Wehmeyer et al. .......... | 725/58 |
| 6,466,132 B1 | * | 10/2002 | Caronna et al. ............ | 340/584 |
| 6,502,758 B1 | | 1/2003 | Cottrell | |
| 6,608,560 B1 | * | 8/2003 | Abrams .................. | 340/539.14 |
| 6,726,112 B1 | * | 4/2004 | Ho .............. | 236/94 |
| 6,789,739 B1 | * | 9/2004 | Rosen ........... | 236/51 |
| 6,868,293 B1 | * | 3/2005 | Schurr et al. ................ | 700/22 |
| 2002/0005435 A1 | | 1/2002 | Cottrell | |
| 2003/0136135 A1 | * | 7/2003 | Kim et al. .................. | 62/125 |

* cited by examiner

Primary Examiner—Marc Norman
(74) Attorney, Agent, or Firm—Reinhart Boerner VanDeuren

(57) ABSTRACT

A field programmable or configurable thermostat for an HVAC system is provided. The configurable thermostat allows field programmability of service contact information, including name and contact telephone number information for the installer or service person. The system reminders and service intervals may be provided based upon calendar time or run time, and may be adjusted to particular periods by the service person in the field. Soft keys whose function is described on various changing menus allow service person to navigate through the various display and information entry screens. Scrolling or selection keys are used in one embodiment to vary the information on appropriate screens. Alternate embodiments utilize touch screens, alphanumeric keypads, etc., for the entry and editing of such information.

20 Claims, 9 Drawing Sheets

THERMOSTAT WITH CONFIGURABLE SERVICE CONTACT INFORMATION AND REMINDER TIMERS

FIELD OF THE INVENTION

The present invention relates generally to thermostatic controls for heating, ventilating, and air conditioning (HVAC) systems, and more particularly to digital programmable thermostatic controls for such HVAC systems.

BACKGROUND OF THE INVENTION

Home and commercial HVAC systems operate to ensure occupant comfort within a dwelling or building despite the changing weather conditions outside. Modern HVAC systems operate via thermostatic control that may be set by a user to maintain the temperature and humidity of the ambient surroundings at a desired and comfortable level.

Such modern HVAC systems typically include a furnace or boiler to provide heating, an air conditioning unit to provide cooling, and a user adjustable thermostat to sense the ambient temperature, compare it to the set temperature desired by the user, and appropriately control the heating and cooling units to maintain the ambient temperature and humidity at the thermostat setpoint. Alternatively or additionally, the HVAC system may comprise a heat pump system that operates to provide both the heating and cooling requirements of the dwelling or structure. To provide an added measure of comfort, typical HVAC systems also include a system air filter to remove allergens and other particulate matter from the air flow to further enhance the comfort level provided by the system.

While such systems operate effectively, to ensure their continued effective operation periodic maintenance and the changing of the filters are required. The filter changing requirements may vary depending on the time of the year, based on the occupant's allergies, environmental conditions, etc. The scheduling of periodic maintenance may have safety related aspects, particularly when involving the furnace. Such periodic maintenance may also detect malfunctions that can have environmental impact, particularly related to the leakage of coolant from an air conditioning unit. In each of these situations, a reduction in efficiency of the HVAC system results in increased cost to the consumer. In these times of soaring energy costs, such preventable reductions in efficiency should not occur.

However, many people simply forget to have their HVAC system periodically checked and maintained. This is because typical HVAC systems operate for long periods of time without requiring any maintenance. This passage of time tends to cause many people to simply forget when the last time their HVAC system was serviced. Further, the reduction in efficiency that may result from inadequate maintenance, while manifesting itself in higher energy bills, does not typically adversely affect the ability of the HVAC system to provide the heating or cooling desired for quite some period of time. As a result, the consumer does not notice any problem with the HVAC system, and may equate increased heating and cooling costs with increased utility prices or particularly severe weather conditions.

Eventually, however, the consumer may remember to have the HVAC system serviced, or a problem may manifest itself in malfunction of the HVAC system. At this point, the consumer needs to determine who to call to have the system serviced or repaired. Unfortunately, the phone book typically contains several listings for HVAC companies, which leads to confusion over who to call.

As people typically like to maintain a relationship with the HVAC company that installed the system or provided service in the past, many HVAC service companies utilize a sticker or magnet affixed to the furnace, air conditioner, heat pump, etc. These stickers typically include the contact information for the service company. Unfortunately, such stickers placed on components of the HVAC system are often difficult to find based in part to the location of these components in poorly lit basements of dwellings. On other of such components, the stickers may be located outside the dwelling, which exposes them to the fading effects of the sun, as well as the weathering effects of rain, snow, etc. As a result, the stickers on the HVAC system components are often ineffective because the consumer cannot find them, or because the information on the sticker has faded over time.

In some instances, for example for the installation of a new system or the upgrade of the thermostatic controller, the service company may include a sticker on the thermostat itself. However, many consumers do not wish to have such an advertisement placed on the outside of the thermostat as it detracts from the aesthetic appeal thereof. As such, many service companies apply a sticker to the underside of the thermostat cover. However, in such a location the stickers often cover important operational instructions for the thermostat controller. Further, the consumer may not realize that the service contact information is on the underside of the cover, and therefore may not even look in this location in an attempt to determine who to call for service. As such, the usage of such stickers is also ineffective to communicate to the customer the appropriate service contact information.

Therefore, there exists a need in the art for a system and method of providing service reminders to consumers for their HVAC system, with such service reminders also including the contact information for the HVAC service company that previously provided service or that installed the system for the consumer.

BRIEF SUMMARY OF THE INVENTION

In view of the above, the present invention provides a new and improved thermostat that provides reminders and service contact information. More particularly, the present invention provides a new and improved thermostat that may be field programmable or configurable by the HVAC service personnel. Such field programmability or configurability preferably allows the inputting of service contact information, including the name of the service company and the contact telephone number. Still further, the service intervals or reminder periods are preferably settable based either on operating times or calendar times.

In one embodiment of the present invention the thermostat includes a dot matrix LCD display that provides both the flexibility and ease of use required for on site, in field configuration by the installer. A feature enabled by the instant invention is the service contact information. This feature allows the installer to enter both the name of his service organization and the contact telephone number or other contact information. The entry of this data may be accomplished in one embodiment by using a keypad and on-screen prompts of the display. Preferably, the keypad includes soft keys whose function varies based upon a particular state of the thermostat. Since the service contact information does not typically change often, the entry of this data may be accomplished through a simple knob or up/down scrolling keys that cycles through the available characters to be entered. Alternatively, an alphanumeric keypad is provided for the entry of such information. In a still further alternate embodiment, a touch screen may be utilized.

An additional feature of the instant invention is the provision of configurable service reminder timers for heating and cooling, or in the case of a heat pump, the system. These reminder and service interval timers may be configured in one embodiment of the present invention based on calendar time or run time. Such calendar time reminders may be set to display the reminder message, for example, every six months. The run time reminder or service interval timer may be set to display the reminder after, for example, 500 hours of heating/cooling operation. Other time intervals may also be set. In an alternate embodiment, the reminders may be set for both run time and calendar time. That is, a reminder will be displayed after a certain number of operating hours, but no later than 6 months. In this way, the system will be checked periodically in times of light usage, or based on actual usage in times of greater demand.

In the case where the HVAC system has been configured for run time durations, and the system has been actively heating for the configured duration, a reminder will appear on the thermostat display recommending the heating system be checked. When the HVAC system has been actively cooling for the configured duration, a reminder will appear on the thermostat display recommending the cooling system be checked. When the heat pump system has been actively running for the configured duration, a reminder will appear on the thermostat display recommending the system be checked. These reminders will contain both the service contact name and contact telephone number configured during installation. When the HVAC system has been configured for calendar time durations, and the configured time has elapsed, a reminder will appear on the thermostat display recommending the system be checked.

Once a reminder is displayed, the consumer can delay the reminder, which will clear the reminder screen and have it reappear at a defined interval. Alternatively, the consumer can reset the reminder, which will clear the reminder screen and reset the service timer. This reminder display may also include mechanisms for visually alerting the consumer that the service reminder is on the display. Such visual mechanisms include turning on the back lit display light, flashing the display at a periodic rate, turning on or flashing an LED, etc. In an alternate embodiment, an audible alert is utilized to draw attention to the thermostat so that the consumer may see the reminder displayed thereon.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
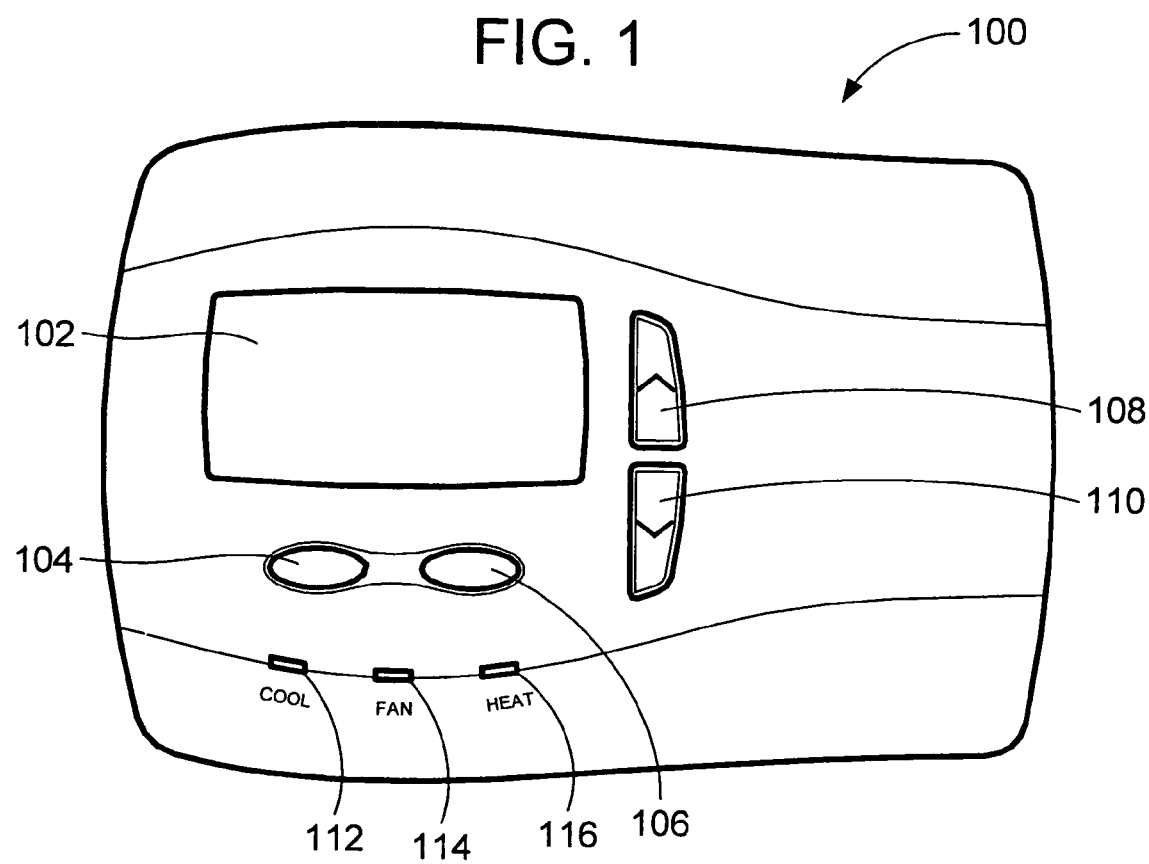
FIG. 1 is a top view illustration of an embodiment of a field configurable thermostat constructed in accordance with the teachings of the present invention.

An embodiment of a thermostat constructed in accordance with the teachings of the present invention to incorporate the filed programmable or configurable service contact information and reminder timers of the invention is illustrated in FIG. 1. As may be seen from this FIG. 1, this embodiment of the thermostat 100 includes a user display 102 on which is displayed programmatic, system, and ambient information regarding the operation of the HVAC system. This user display 102 may take various forms as are well-known in the art, and in a preferred embodiment is a dot matrix LCD display. With such a display 102, the consumer or service person may activate various programmatic and control functions via a pair of soft keys 104, 106. The functionality executed by these soft keys 104, 106 varies dependent upon the programmatic state in which the thermostat 100 is at the time one of the soft keys 104, 106 is depressed. The particular functionality that will be instituted upon selection of one of the soft keys 104, 106 is displayed in an area of the user display 102 proximate the key 104, 106 which will institute that function. That is, the function that will be instituted upon selection of soft key 104 will be located generally in the lower left hand portion of user display 102 while the functionality that will be instituted by selection of soft key 106 will be located generally in the lower right hand portion of user display 102. These functional indicators may change depending on the program state and mode in which the thermostat is currently operating.

In addition to the soft keys 104, 106, this embodiment of the thermostat 100 of the present invention also includes adjustment keys 108, 110. These adjustment keys 108, 110 may serve to adjust a currently selected parameter up or down, such as in the case of setting the control temperature at which the thermostat will maintain the ambient environment. Additionally, these keys 108, 110 may scroll through the available data for a selected parameter, such as scrolling through alphanumeric data that may be selected for a given parameter. Such functionality will be discussed more fully below with regard to the entry of service contact information. These keys 108, 110 may also function as soft keys depending on the programmatic state in which the thermostat is operating. When this functionality is provided, the function that will be instituted by selection of key 108 will be provided generally in the upper right hand corner of display 102, while the functionality that will be instituted by selection of key 110 will be displayed generally in the lower right hand corner of user display 102. In addition to the above, other use input means, such as an alphanumeric keypad, user rotatable knob, a touch screen, etc. may be utilized instead of the buttons 104–110 illustrated in the embodiment of FIG. 1.

In this embodiment, the thermostat 100 also includes operating mode visual indicators 112, 114, 116. These indicators 112–116 provide a visual indication of the current operating mode of the thermostat. In the embodiment illustrated in FIG. 1, indicator 112 will illuminate while the thermostat 100 is operating in the cooling mode. Indicator 116 will illuminate while the thermostat 100 is operating in the heating mode. Finally, indicator 114 will illuminate to indicate that the fan is operating. Depending on the particular application, this indicator 114 may illuminate whenever the fan is running, or may illuminate only when the fan is selected to run continuously.

In embodiments of the present invention that do not utilize automated switching control between the heating and cooling modes of operation, these indicators 112–116 may operate as user selectable switches to allow the consumer to select the operating mode of the thermostat 100. For example, during the summer months the consumer may select the cooling mode by depressing indicator 112. In this mode, the furnace will not be turned on even if the interior ambient temperature drops below the set point. To switch from the cooling to the heating mode of operation, the consumer, in this alternate embodiment, would need to select indicator 116 to allow the thermostat 100 to operate the furnace. Consumer selection in this embodiment of indicator 114 would operate the fan continuously, as opposed to its normal automatic operation based upon a call for cooling or heat by the thermostat 100. In a still further embodiment of the present invention, as will be discussed more fully below, the indicators 112–116 may also be utilized to provide a visual indication of system trouble, or that there is a system reminder message being displayed on user screen 102.

Having discussed the physical structure of one embodiment of a thermostat 100 constructed in accordance with the teachings of the present invention, the discussion will now focus on the field programmability or configurability of the service contact information and the setting of the reminder and service timers which form an aspect of the present invention. Indeed, while the following discussion will utilize the structure of the thermostat 100 illustrated in FIG. 1, those skilled in the art will recognize that various other structures can be utilized with this field programmability or configurability programming without departing from the spirit and scope of the present invention. That is, regardless of the user input mechanisms utilized by the particular embodiment of the thermostat 100 of the present invention, the programmatic steps and display information provided in the following discussion may be used.

Figure 2:
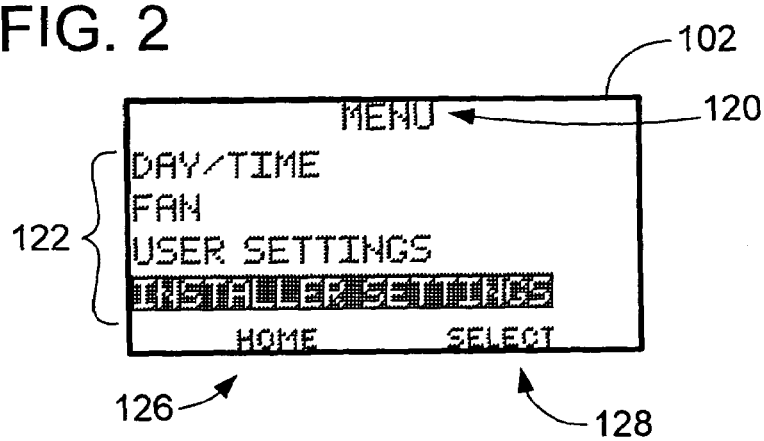
FIGS. 2–23 illustrate user display screens generated by and usable with the embodiment of the configurable thermostat of the present invention illustrated in FIG. 1 for field programming the thermostat.

FIG. 2 illustrates an exemplary Main Menu screen that may be provided on display 102. This Main Menu screen includes a title 120, and a number of items that may be selected by a user in area 122. While various options are provided from the main menu illustrated in FIG. 2, the following discussion will focus on the INSTALLER SETTINGS item shown highlighted in FIG. 2. To highlight the installer settings item, the user would utilize keys 108, 110 to scroll through the list of available items in area 122 until the INSTALLER SETTINGS item becomes highlighted as illustrated in FIG. 2. Once the desired item has been highlighted, the user would depress soft key 106 corresponding to the "SELECT" function illustrated in area 128 of display 102. If, instead, the user were to have selected soft key 104, the "HOME" function would have been selected as indicated in area 126 of display 102. This would take the user back to the "HOME" screen for the thermostat 100.

Figure 3:
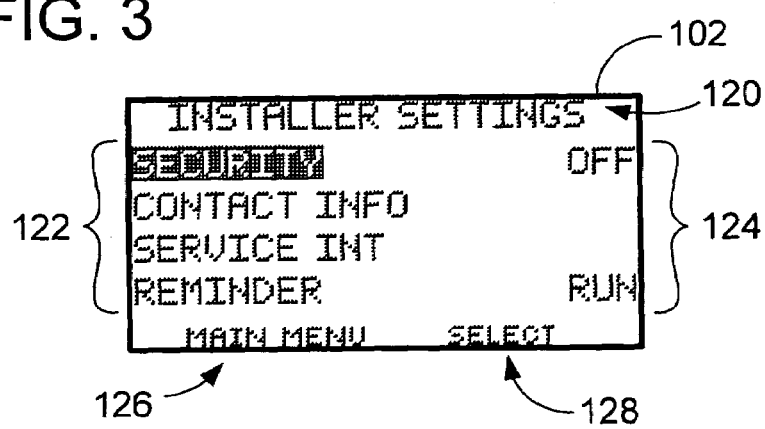

Assuming for the following discussion that the user has selected the INSTALLER SETTINGS item, the Installer Settings screen illustrated in FIG. 3 would be displayed. This Installer Settings screen shown on display 102 includes a title 120 identifying this as the Installer Setting screen. Selectable items are again displayed in area 122, and status information for each of those selectable items, as appropriate, are illustrated in proximity to each item in area 124. As may be seen from this FIG. 3, the installer SECURITY feature is currently turned off, and the REMINDER period is currently set to run time.

Figure 4:
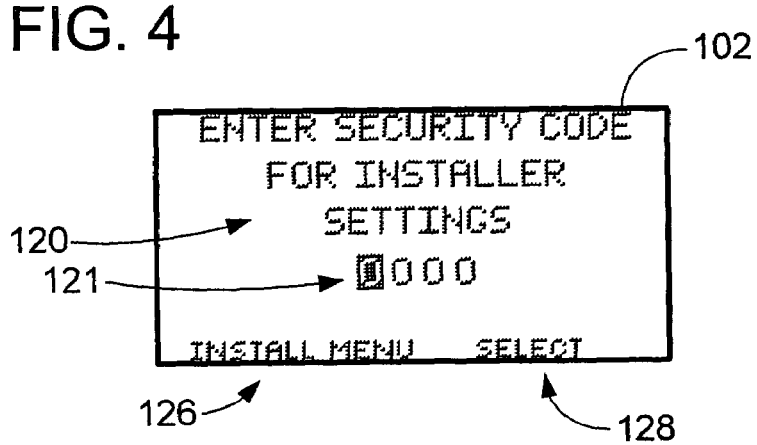
Figure 5:
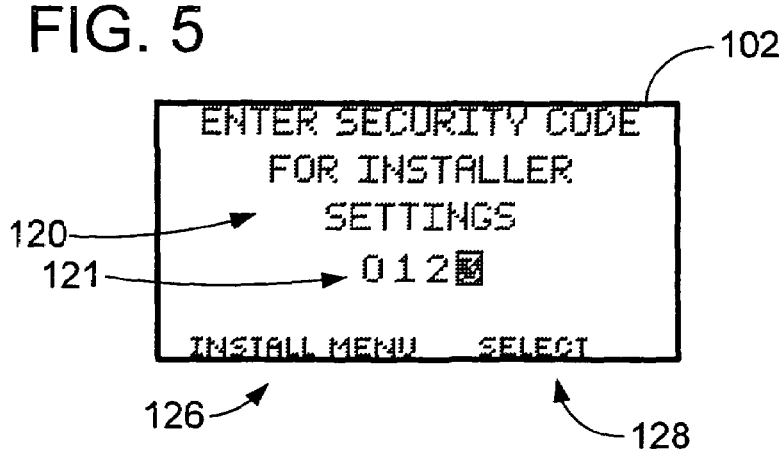
Figure 6:
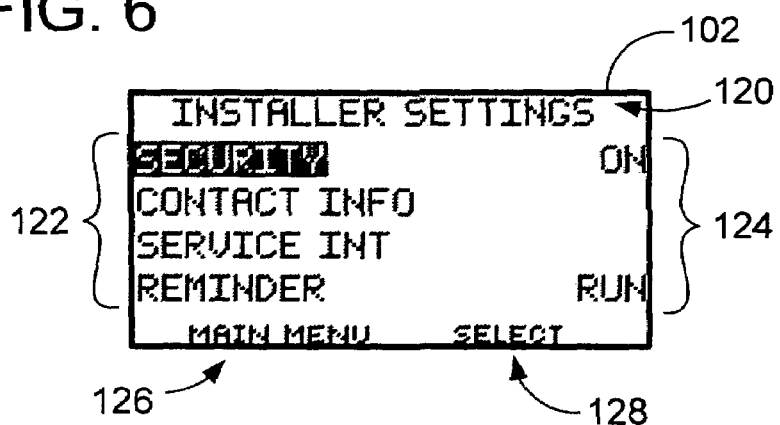

If the service personnel were to select soft key 106 corresponding to the "SELECT" function displayed in area 128, the Security Code Entry screen illustrated in FIG. 4 would be displayed on user display 102. This Security Code Entry screen includes a title area 120, as well as the security code entry area 121. Through this screen the service person is able to enter a security code by using keys 108, 110 to scroll through the available entries for each segment of the security code. In one embodiment of the present invention the security code is a four-digit numeric code, although more or fewer digits as well as alphanumeric characters may be utilized as desired. Once the service person has selected the first digit, the service person would depress soft key 106 corresponding to the "SELECT" function to move to the next digit in the security code. FIG. 5 illustrates the Security Code Entry screen once all four digits have been entered by the service person. At this point, the security person would select soft key 104 to return to the "Install Menu" as indicated in area 126 of display screen 102. The Installer Settings screen, which will then be displayed, now indicates that the security function is turned on as illustrated in area 124 of FIG. 6.

Figure 7:
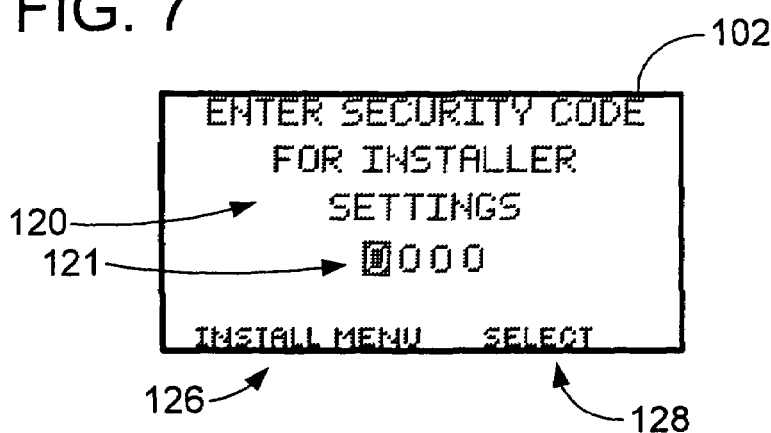

Once the security function has been turned on, a user attempting to access the Installer Settings screen from the Main Menu will be prompted to enter the security code through the display illustrated in FIG. 7 before the user will be given access to the Installer Settings screen. As may be seen from this FIG. 7, the user is prompted to enter the security code for the installer settings in area 121. The selection and entry of each digit of the security code proceeds as discussed above. Once the user has entered the security code, the user would select soft key 104 to open the Install Menu as indicated by the designation in area 126.

Figure 8:
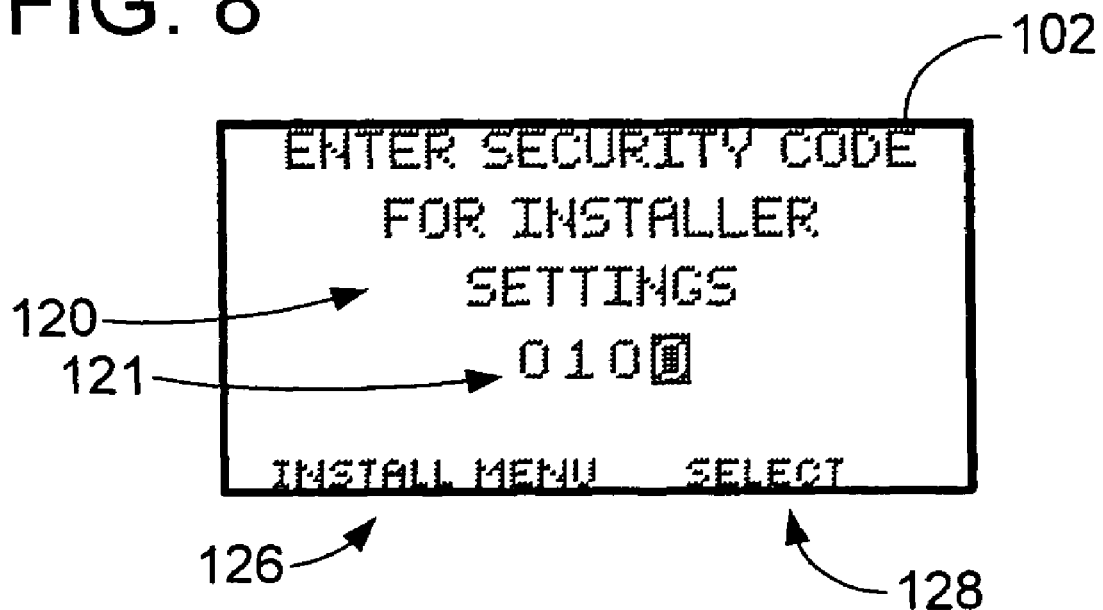
Figure 9:
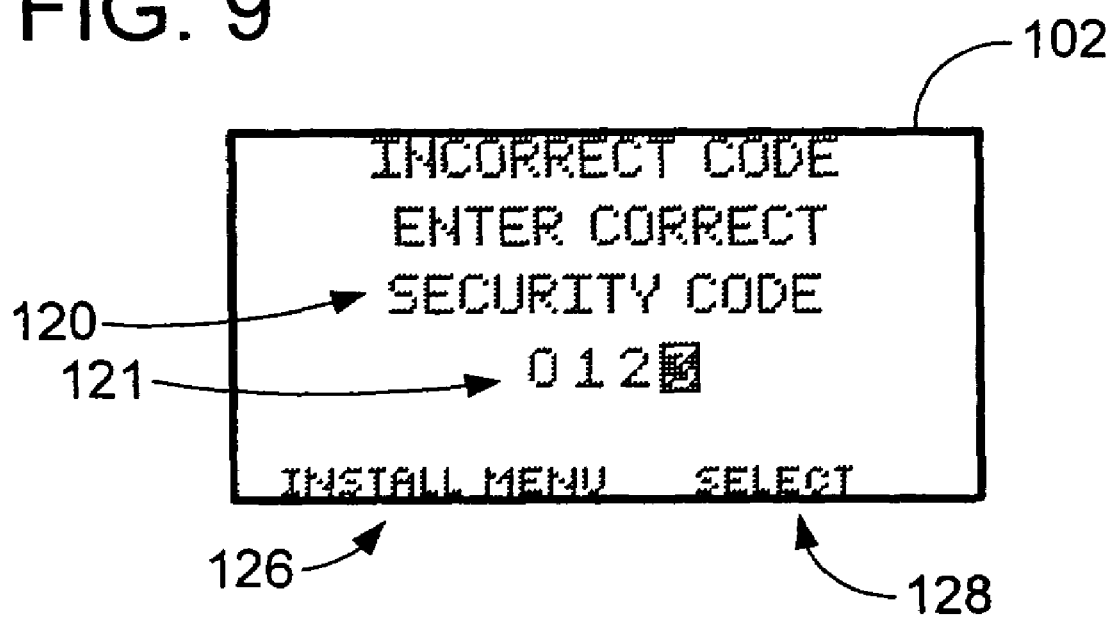

In the screen display illustrated in FIG. 8, the wrong security code has been entered in area 121 by the user attempting to access the Installer Settings screen. As will be recalled from the foregoing description, the security code that was entered is 0123 (see FIG. 5). However, as may be seen from FIG. 8, the user has entered the security code 0100. If the user were to select soft key 104 in an attempt to access the Install Menu, an Error screen indicating that the incorrect code had been entered and that the user must enter the correct security code before getting access to the Install Menu will be displayed. The screen illustrated in FIG. 9 illustrates such an error screen. As may be seen from this FIG. 9, the user has now entered the correct code in area 121. If the user were now to select soft key 104, the Installer Setting screen will be made available to the user.

Figure 10:
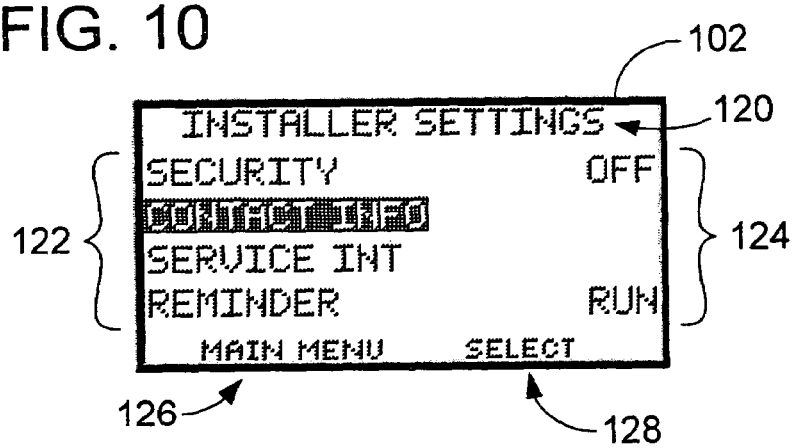

To allow field programmability of the service contact and reminder information, an Installer Settings screen such as that illustrated in FIG. 10 is displayed on the user display 102. This Installer Settings screen includes a title portion 120 to indicate to the user which screen is currently being displayed. The functionality selectable from this screen is displayed in this embodiment on the left hand side of display 102 in a scrollable area 122. Along the right hand portion of display 102, in alignment with its associated function, is the status information in area 124. For example, this screen indicates that the security function is currently turned off, while the reminder function is currently set to run time. This screen also includes the functionality of the soft keys 104, 106 (see FIG. 1) in respective areas 126, 128 along the bottom edge of display 102. As discussed above, the information contained in these two locations 126, 128 indicates to the consumer the action that will be taken when soft button 104 or 106 is selected, respectively. As an example, if soft button 104 were selected from the screen illustrated in FIG. 10, the display 102 would revert back to the main menu of the thermostat.

Figure 11:
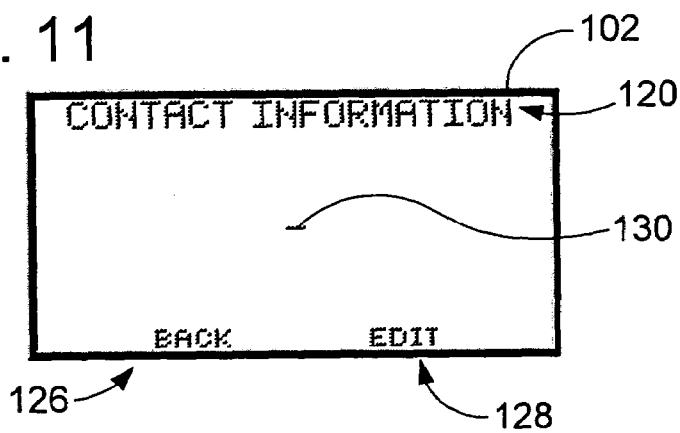

The scrolling between the various displayed items in area 122 is accomplished via the adjustment or selection keys 108, 110 (see FIG. 1). That is, from the currently highlighted selection indicated in area 122, selection of key 108 will select the next higher item, while selection of key 110 will select the next lower item. As illustrated in the display 102 of FIG. 10, the contact information selection is currently highlighted. If the service person were to select soft key 106, this item would be selected. The thermostat of the present invention would then display the Contact Information entry screen as illustrated in FIG. 11.

This Contact Information screen displays the screen title in the title section 120 so that the service person can be assured that the correct screen has been selected. Upon initial selection of the Contact Information entry screen of FIG. 11, a blank cursor 130 is displayed to indicate where the contact information will be entered. If the service person were to select soft button 104, the programming of the thermostat of the present invention would revert to the previous screen as indicated by the "BACK" functional description in area 126. However, if the service person wishes to edit the information contained on the Contact Information screen, he would select soft button 106 which corresponds to the "EDIT" function displayed in area 128. This will allow the service person to enter or edit information that will be displayed when the service reminder is called.

Figure 12:
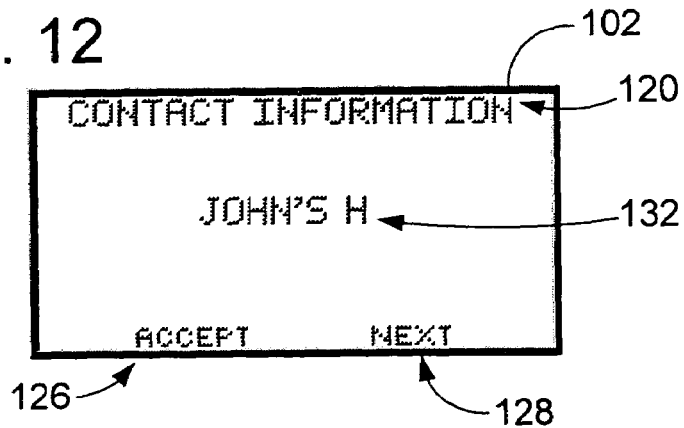

Once the service person has selected the edit function, he will then be able to utilize the selection keys 108, 110 to scroll through the available options for each digit of information that he wishes to enter. The available options for this information are not limited by the present invention, but instead may include alphabetic characters, numerical characters, symbols, foreign glyphs, etc., as desired by a particular application. Both upper and lower case letters may also be included as desired. The scrolling operation for each segment of the display is conventional, and will simply rotate through the available options in a forward or reverse direction depending upon which of the selection keys 108, 110 is depressed. Once the correct input for a particular segment is obtained, the service person selects soft key 106 which corresponds to the "NEXT" function indicated in area 128. This moves the input to the next segment of the display. A partially complete line of information is illustrated during this entry process in FIG. 12. Once the service person has entered all of the information that he wishes to include on the first line 132 of the contact information display, the service person will select soft key 104 which corresponds to the "ACCEPT" function indicated in area 126 of display 102.

Figure 13:
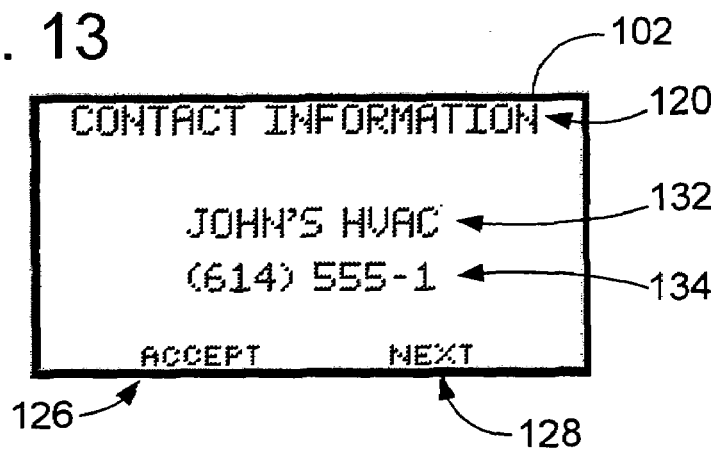
Figure 14:
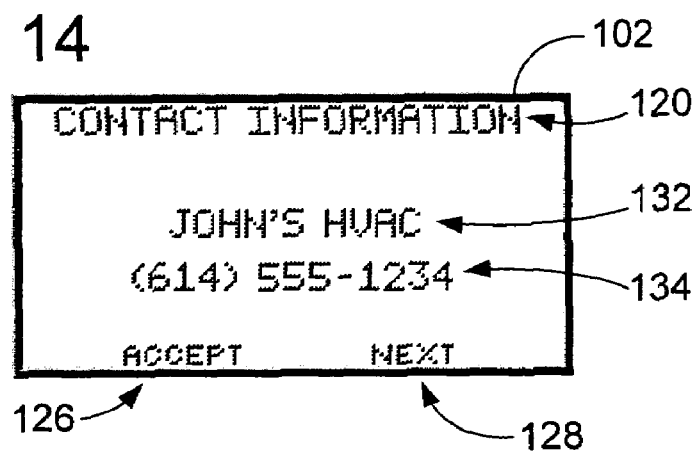

Once the first line 132 has been completed and the "ACCEPT" function has been selected, the thermostat of the present invention will display the contact information entry screen that allows further contact information to be entered on a second line 134 of the display 102. Such a display having some information entered on this second line is illustrated in FIG. 13. The entry of information on this second line 134 proceeds in a similar fashion to that described above with regard to the first line 132. That is, each individual segment of the information to be displayed is selected via keys 108, 110, while each subsequent segment is made available by selection of the soft key 106 corresponding to the "NEXT" function illustrated in area 128 of display 102. Once the service person has finished entering the contact information, as illustrated in FIG. 14, the service person would select soft key 104 which corresponds to the "ACCEPT" function illustrated in area 126. The display 102 will then return to the Installer Settings screen.

Figure 15:
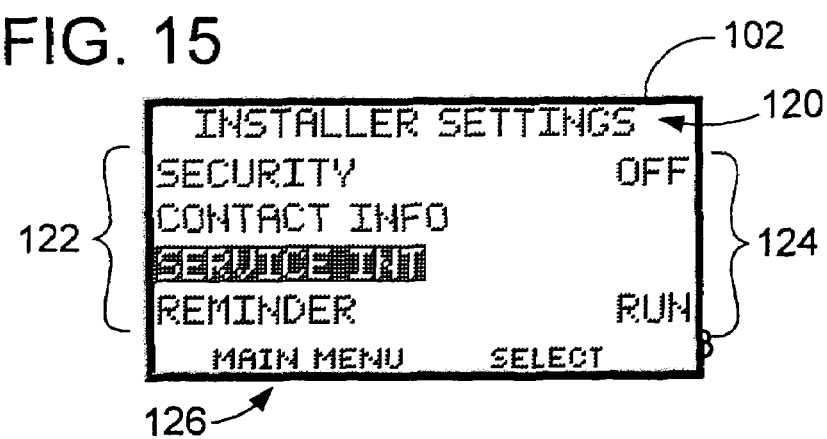

If the service person were to scroll down to the Service Interval item on the Installer Settings screen, the screen would appear as illustrated in FIG. 15. From this screen, the user may select soft key 104 which will cause the thermostat of the present invention to return to the "MAIN MENU" as indicated in area 126 of display 102. However, if the service person were to select soft key 106, the "SELECT" function would be instituted as indicated in area 128. Since the highlighted item in area 122 is the Service Interval item, selection of soft key 106 will result in display of the Service Monitor Menu illustrated in FIG. 16.

Figure 16:
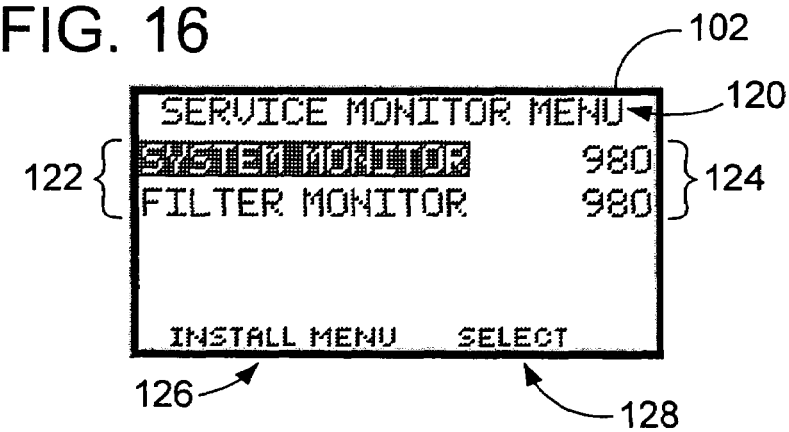

The Service Monitor Menu screen illustrated in FIG. 16 includes the system items for which monitoring may be accomplished in area 122, in the current monitor interval indicated in area 124. The selection keys 108, 110 may be utilized as discussed above to select which of the items in area 122 the service person would like to adjust. Once the appropriate item in area 122 has been highlighted, the user would select soft key 106 which will institute the "SELECT" function indicated in area 128. However, if the service person does not wish to adjust the monitor settings indicated in area 124 for any of the items illustrated in area 122, the service person would select soft button 104 which will return the display 102 to the "INSTALL MENU" as indicated in area 126.

Figure 17:
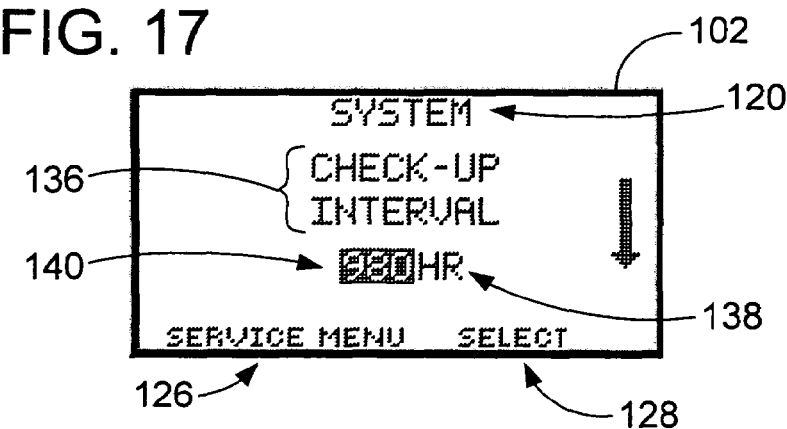

If the user had selected soft button 106, the System Check-Up Interval screen illustrated in FIG. 17 would be displayed. This screen, which is appropriate for thermostats configured for heat pump operation, includes a "CHECKUP INTERVAL" subtitle in area 136, the currently selected interval period 138, and the value in highlighted area 140. From this screen, the user may adjust the checkup interval by utilizing the selection keys 108, 110 to adjust the value in highlighted area 140. Once the service person has selected the desired checkup interval, he may select soft key 106 which will institute the "SELECT" function indicated in area 128. Alternatively, the service person could select soft key 104 which would institute the "SERVICE MENU" function illustrated in area 126. In either case, the user display would return to the service monitor menu illustrated in FIG. 16. The updated information entered on the system monitor screen of FIG. 17 will then be displayed in the appropriate section of area 124, which will provide confirmation to the service person that the adjusted information has been entered into the system. In one embodiment of the present invention, a selection of soft key 104 while the screen of FIG. 17 is displayed, will abort the change of the check up interval. In this embodiment, the newly entered information will only be entered into the thermostat's programming if the "SELECT" function is initiated by selecting soft key 106.

Once the service person has finished adjusting all of the system monitor parameters that are desired, the service person would then select soft key 104 which would institute the "INSTALL MENU" function illustrated in area 126 of FIG. 16. This will return the user display 102 to the Installer Settings screen illustrated in FIG. 18 in an embodiment that automatically scrolls to the next item in area 124. Alternatively, the Installer Settings screen illustrated in FIG. 15 will be displayed, which will require the user to use the select keys 108, 110 to scroll to a desired item.

Figure 18:
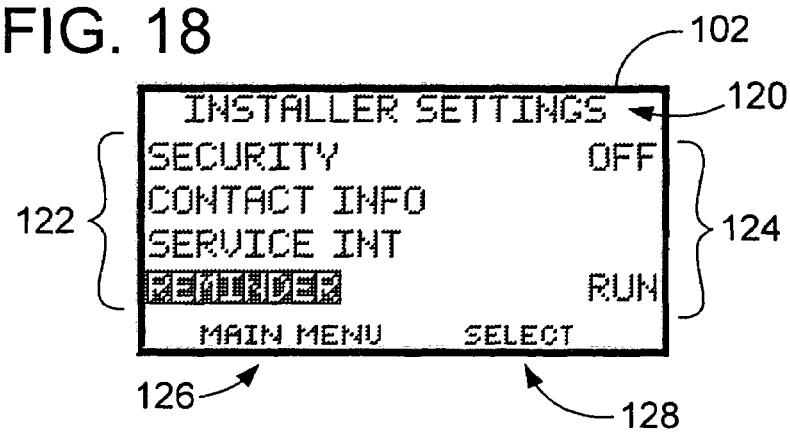
Figure 19:
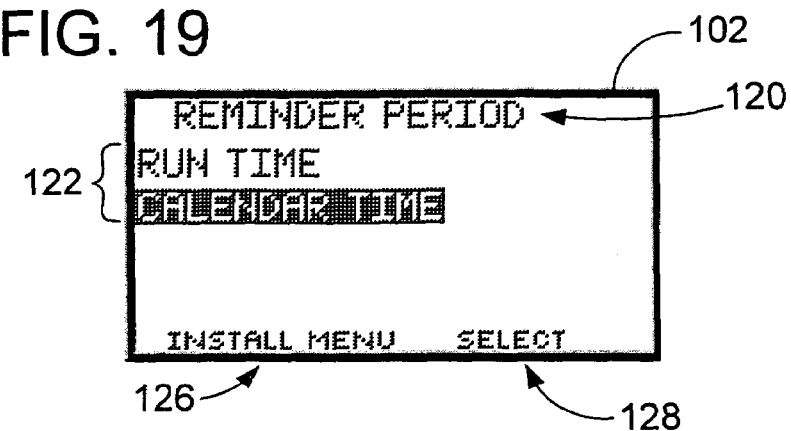

Once the Installer Settings screen illustrated in FIG. 18 is displayed on the user display 102, selection of soft key 106 will institute the "SELECT" function illustrated in area 128. Since the "REMINDER" item is highlighted, selection of soft key 106 will cause the user display 102 to display the Reminder Period screen illustrated in FIG. 19. From this Reminder Period screen of FIG. 19, the user may utilize keys 108, 110 to switch between run time and calendar time. This will allow the service person to set all service and system reminders based on either operating time or a calendar time. If soft key 106 is selected from the Reminder Period screen of FIG. 19, calendar time will be selected, and the Installer Settings screen of FIG. 20 will be displayed indicating that the Reminder Period is now calendar time by the "CLNDR" indication in area 124. However, if soft key 104 is selected while the reminder period screen of FIG. 19 is displayed, the thermostat 100 will simply return to the "INSTALL MENU" without changing the reminder period. The Installer Settings screen that will be displayed will indicate area 124 that the reminder period has not changed. In the preceding example, the Installer Settings screen that will be displayed will indicate "RUN" in area 124 adjacent the "REMINDER" item.

Figure 20:
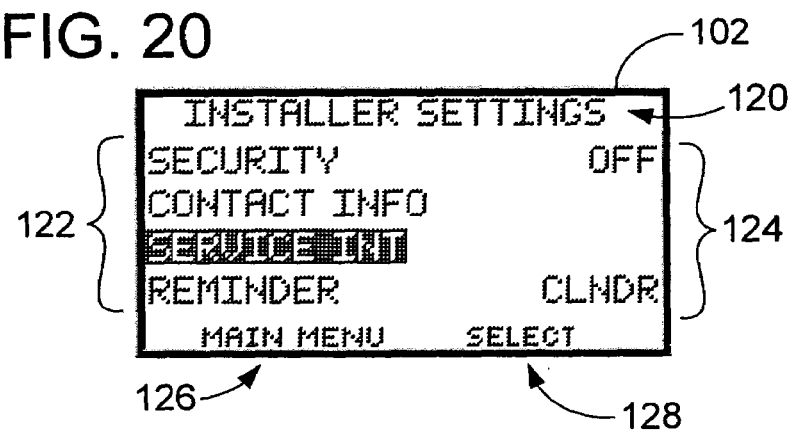

Assuming now that the service person has changed the reminder period from run time to calendar time by selecting soft key 106 when the Reminder Period screen of FIG. 19 was displayed, the Installer Settings screen of FIG. 20 will be displayed. If the service person then utilizes the select keys 108, 110 to select item "SERVICE INT" as illustrated in FIG. 20, and then selects soft key 106 to institute the "SELECT" function indicated in area 128 of display 102, the Service Monitor Menu screen of FIG. 21 will be displayed. As may now be seen, the system monitor and filter monitor time periods indicated in area 124 reflect the system change from run time to calendar time.

Figure 21:
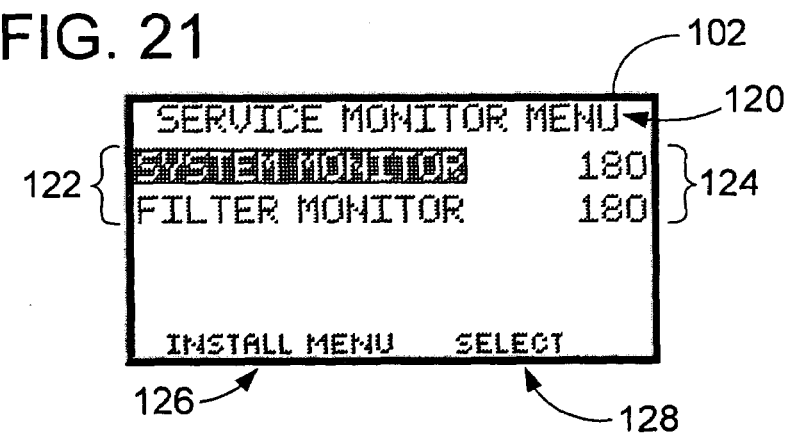
Figure 22:
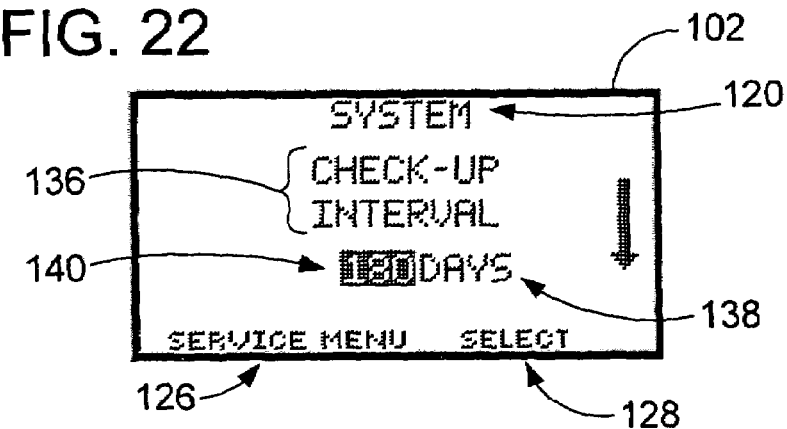

If the user were to select soft button 106 while the Service Monitor Menu of FIG. 21 were displayed, the System Check-Up Interval editing menu illustrated in FIG. 22 would be displayed. As may be seen from this FIG. 22, the service interval in area 138 now reflects calendar days instead of run hours as was displayed when the reminder period was set to run time. The adjustment of the information in area 140 may be accomplished as discussed above.

Figure 23:
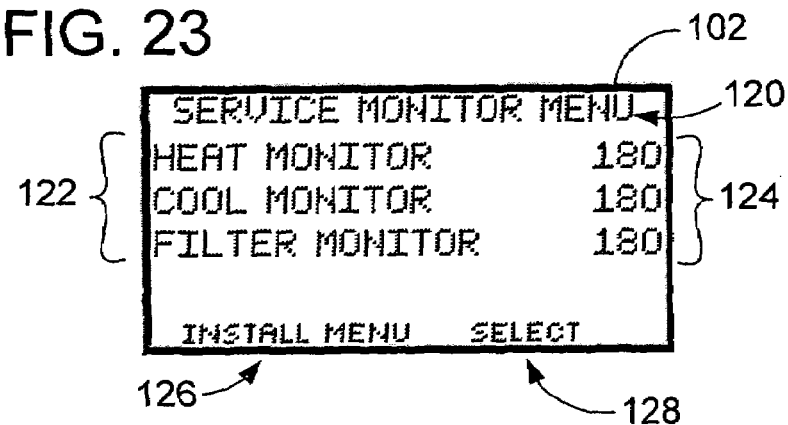

The Service Monitor menus discussed above with regard to FIGS. 8 and 13 are particularly adapted to heat pump systems. However, in non-heat pump systems, the Service Monitor menu would appear as illustrated in FIG. 23. As will be noted, the system monitor item is no longer available, and is instead replaced with a heat monitor item and a cool monitor item. Selection of either of these items will provide the system checkup interval editing screen for that particular selected item, whose adjustment will be accomplished as described above.

Having now discussed an embodiment of a field-programmable or configurable thermostat and exemplary user display screens that may be generated to implement the functionality of the present invention, operation of this system once the installer has completed the configuration of the thermostat 100 will now be discussed. Consumer programming and operation of the various heating and cooling modes provided by the thermostat is conventional as well known in the art. That is, the consumer is allowed to set a desired temperature, and possibly select a heating or cooling modes of operation to maintain the ambient temperature of the dwelling or building at a desired level. Various programming options may be provided such as separate daily and weekend programming, as well as various programmed temperatures for different periods of the day and night.

Figure 24:
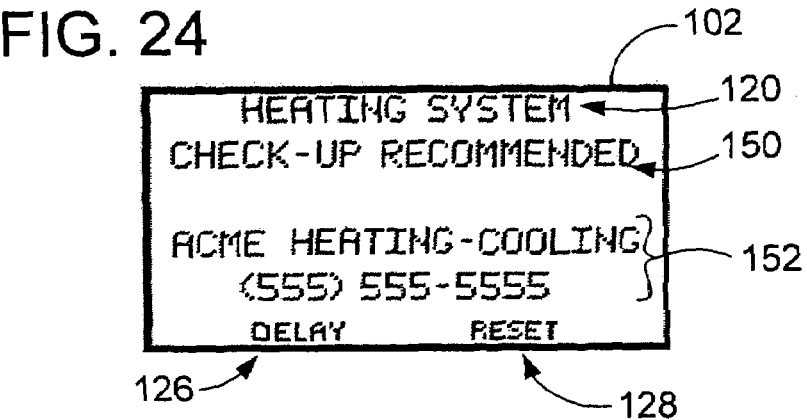
FIG. 24 illustrates an exemplary service reminder screen generated by the system of the present invention.

During this period of normal operation, the reminder timers programmed as discussed above will continue to count down either based on the lapse of time in the event of the programmed intervals being in calendar mode, or the operating time of the heating or cooling equipment in the event that the timers are set to run time. Once the programmed period of time has passed, the thermostat 100 of the present invention will display a System Checkup Reminder screen, such as that illustrated in FIG. 24. As may be seen from this exemplary system checkup screen, the first line of the title 120 indicates the particular system or system component for which this reminder is being displayed. In the example of FIG. 24, the reminder screen is being generated for the heating system. The second line 150 of the title describes the system-generated message applicable to the situation for which this reminder was generated. In the exemplary embodiment of FIG. 24, this message merely indicates that a check-up is recommended. However, other messages that may be generated by the system include system failure diagnostic messages in the event that a system malfunction has occurred.

In addition to the title information displayed on lines 120 and 150, this notification screen also includes the name and contact telephone number in area 152 so that the consumer may contact the appropriate HVAC service company for service. An advantage of the system of the present invention is that both the name of the service company and the contact telephone number are displayed so that the user may make an intelligent, informed decision with regard to scheduling service. That is, the user may now be aware of exactly who will be called if the consumer chooses to utilize this telephone number. This provides a significant advantage over merely displaying only a contact telephone number because consumers would be unaware who they would reach if the number displayed were called. As a result, consumers might not utilize the displayed telephone number since they would be unsure who they would reach.

The soft keys 104, 106 may be utilized when the Notification screen of FIG. 24 is illustrated to delay the reminder, or to reset the reminder, respectively. If the soft key 104 is selected, the normal thermostat display will return to the screen 102 until a predetermined period of time passes. This predetermined period of time may vary as desired for a particular application. Exemplary periods could range from one day, to one week, to one month, etc. Intermediate period of times may also be utilized. If the soft key 106 were selected while the screen of FIG. 24 were displayed, the service reminder would be reset to the original reminder interval programmed as discussed above. Since resetting the service reminder will require the original service interval period to pass before being displayed again, a confirmation screen may also be provided to avoid inadvertent resetting of this time period.

In addition to displaying the Service Interval Reminder screen, such as that illustrated in FIG. 24, or Service Diagnostic screens discussed above, the thermostat of the present invention may also provide other visual indicators to increase the likelihood that the consumer will notice this reminder. Such visual indicators could include illumination of a backlight for a display screen 102. This illumination could be continuous until acted upon by the consumer, or may be activated for a short period of time. Alternatively, the backlighting for the display 102 could be turned on and off at a periodic rate, such as for example 1 hertz, to further increase the conspicuousness of the reminder screen. Alternatively, one or all of the indicators 112–116 (see FIG. 1) could be illuminated or flashed to draw attention to the thermostat controller. Alternatively, a separate LED indicator could be energized to provide the visual indication.

In addition to or as an alternate of the visual indication, the thermostat of the present invention may also incorporate an audible indicator to increase the likelihood that the reminder screen will be timely noticed by the consumer. This audible indicator could be simple chirp similar to the low battery indicators used in other electronic devices, for example smoke detectors. Other audible indicators could also be used including synthesized voice notification.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A field-programmable thermostat for use in an HVAC system that includes at least one remotely located HVAC component, comprising:
   a user display screen;
   a user function selection means for inputting a user selection associated with a function indicated on the user display screen;
   a user scrolling means for allowing a user to scroll among available items and parameters; and
   wherein the thermostat automatically displays a service reminder screen on the user display for the at least one remotely located HVAC component at the expiration of a reminder interval, the service reminder screen including at least one field for displaying a name of a service organization and a contact telephone number.

2. The thermostat of claim 1, wherein the reminder interval is user settable via the user scrolling means to one of a run time and a calendar time.

3. The thermostat of claim 2, wherein a period of the reminder interval is user settable via the user scrolling means.

4. The thermostat of claim 3, wherein the period of the reminder interval is individually user settable for each of the at least one remotely located HVAC component of an HVAC system.

5. The thermostat of claim 1, wherein the name of the service organization and the contact telephone number are programmable by a service person during servicing and installation of the thermostat via the user function selection means and the user scrolling means.

6. The thermostat of claim 5, wherein the name of the service organization and the contact telephone number are editable by a service person during servicing and installation of the thermostat via the user function selection means and the user scrolling means.

7. The thermostat of claim 1, wherein the user function selection means comprises a pair of soft keys located in proximity to the user display screen.

8. The thermostat of claim 1, wherein the user scrolling means comprises a pair of selection keys.

9. The thermostat of claim 1, further comprising a visual indicator that is activated when the reminder message is displayed on the user display.

10. The thermostat of claim 9,
   wherein the visual indication comprises illumination of a back lighting of the user display.

11. The thermostat of claim 10, wherein the back lighting of the user display is cycled at a given rate.

12. The thermostat of claim 10, wherein the back lighting of the user display is terminated after a period of time.

13. The thermostat of claim 1, further comprising an audible indicator that is activated when the reminder message is displayed on the user display.

14. The thermostat of claim 1, wherein a reset function is provided on the user display when the service reminder message is displayed, the service reminder message being reset for the reminder interval upon user selection of the reset function via the user function selection means.

15. A field-programmable thermostat for use in an HVAC system that includes at least one remotely located HVAC component, comprising:
   a user display screen;
   a user function selection means for inputting a user selection associated with a function indicated on the user display screen;
   a user scrolling means for allowing a user to scroll among available items and parameters;
   wherein the thermostat automatically displays a service reminder screen on the user display for the at least one remotely located HVAC component at the expiration of a reminder interval, the service reminder screen including at least one field for displaying a name of a service organization and a contact telephone number; and
   wherein a delay function is provided on the user display when the service reminder message is displayed, the service reminder message being delayed for a predetermined period upon user selection of the delay function via the user function selection means.

16. A thermostat for use in an HVAC system having at least one remotely located HVAC appliance, comprising a user display, and a service reminder screen displayed automatically on the user display, the service reminder screen including a first field containing information identifying a name of a service organization and a second field containing information identifying a contact telephone number associated with the service organization identified in the first field.

17. The thermostat of claim 16, further comprising means for entering the information identifying the name of the service organization in the first field and the contact telephone number associated therewith in the second field during installation and servicing of at least one of the thermostat and the at least one HVAC appliance.

18. The thermostat of claim 16, further comprising an installer settings screen from which a service person can set a reminder period to one of calendar time and run time.

19. The thermostat of claim 18, wherein the information in the first field identifying the name of the service organization and the information in the second field identifying the contact telephone number associated therewith is editable via the means for entering the information from the installer settings screen.

20. A digital thermostat, comprising:

a user display screen;

a pair of soft keys located in proximity to the display screen, the function of the soft keys being indicated on the user display screen in proximity thereto;

a pair of selection keys for scrolling through available items on the user display screen; and a service reminder screen automatically displayed on the user display screen upon the expiration of a field-programmed time interval of one of calendar time and run time, the service reminder screen including at least one field for containing contact information including a name of a service organization.

\* \* \* \* \*